Feb. 15, 1966   H. C. KING ETAL   3,235,084
FUEL FILTER WITH HEATING UNIT
Filed Jan. 30, 1962

INVENTORS
Harold C. King
Jesse B. Mellett

By A. G. Douras
Attorney

United States Patent Office 3,235,084
Patented Feb. 15, 1966

3,235,084
FUEL FILTER WITH HEATING UNIT
Harold C. King, Indianapolis, and Jesse B. Mellett, Zionsville, Ind., assignors to Stewart-Warner Corporation, Chicago, Ill., a corporation of Virginia
Filed Jan. 30, 1962, Ser. No. 169,774
3 Claims. (Cl. 210—149)

This invention relates to a fuel filter device, and in particular, to a fuel filter device having a heating unit effective to maintain fuel within the device above a predetermined temperature.

Certain types of liquid hydrocarbon fuels, particularly those commonly used in diesel engines, are very sensitive to temperature changes. At the low end of the permissible temperature range the viscosity of the fuel increases and thus its ability to flow. Similarly at low temperatures near the cloud point of the fuel, various wax constituents of the fuel commonly separate from solution and remain as particles suspended in the fuel.

Under such low temperature conditions attempts to pump or filter the fuel are not entirely satisfactory. With reference to a filtering unit the suspended wax particles tend to become lodged within a filter element and/or at all sharp bends in the flow path. The accumulated particles coagulate in such a manner to form a solid which is not returnable to solution. In so doing the fuel characteristic becomes less desirable while also the clogged filter element hinders or even stops through-flow.

Accordingly, an object of this invention is to provide a fuel filter device with appropriate heating means effective to maintain a fuel circulating through the device above a minimum temperature.

Another object of this invention is to provide a fuel filter device with a heating unit which is thermostatically controlled effective to maintain a fuel passing through the device within a desired temperature range.

Another object of this invention is to provide a fuel filter device of which each component therefor is easily and economically fabricated, and can be assembled or disassembled individually thereby ensuring economical maintenance and dependable operation.

These and other objects will be more fully appreciated after a complete disclosure of the subject invention given in the following specification, the drawing forming a part thereof, wherein.

Figure 3:
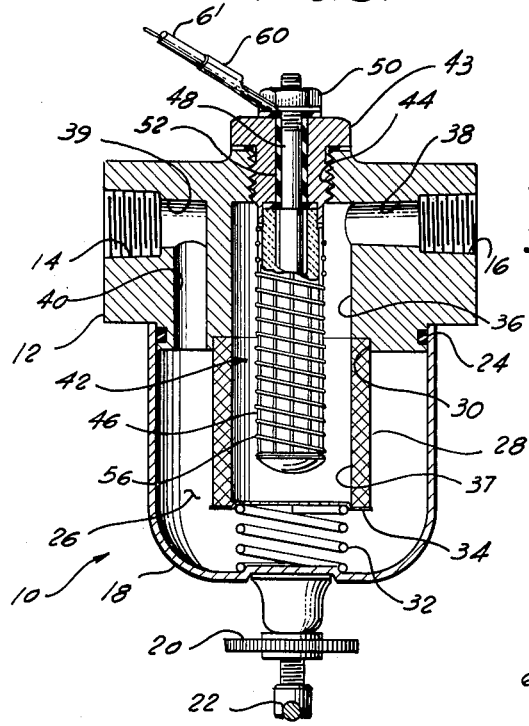
FIG. 3 is a section view as seen from line 3—3 of FIG. 1.
Figure 1:
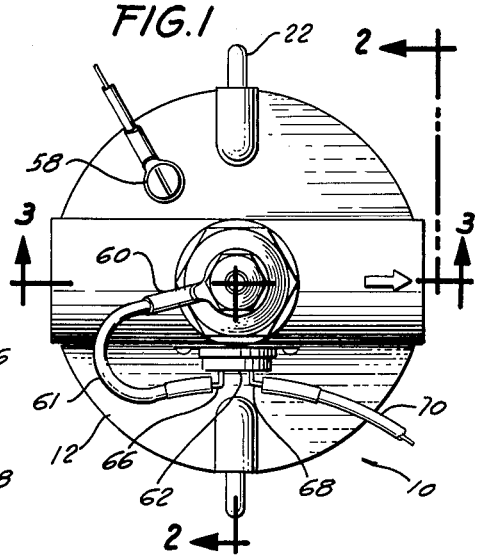
FIG. 1 is a plan view of a particular embodiment of the subject fuel filter device.
Figure 2:
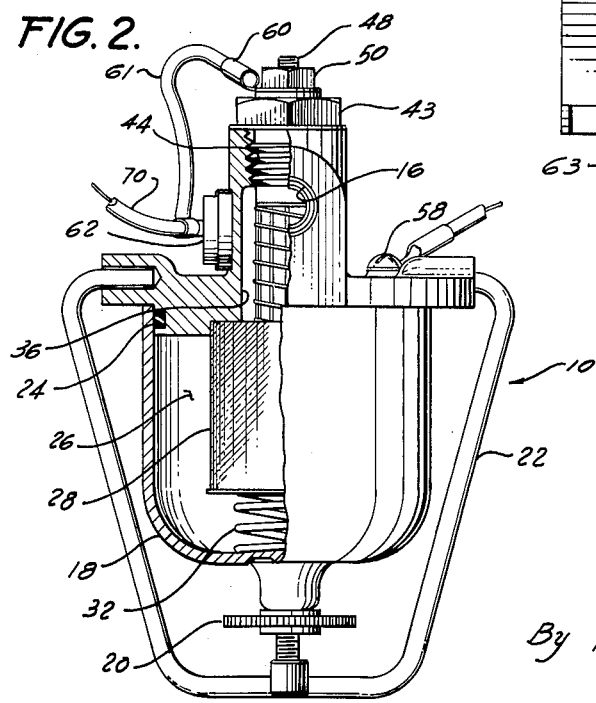
FIG. 2 is an elevational view partly in section as seen generally from line 2—2 of FIG. 1.
Figure 4:
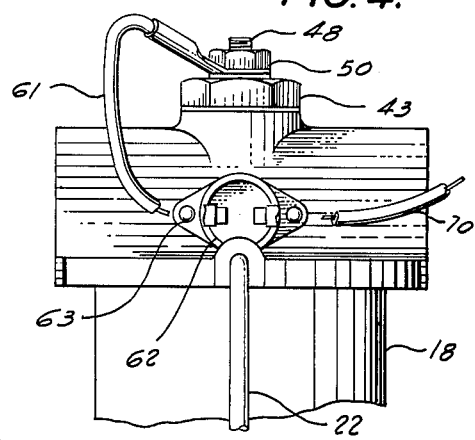
FIG. 4 is a partial elevational view as seen from the bottom of FIG. 1.

The particular fuel filter device shown includes generally a body having a continuous fuel passageway between an inlet and an outlet, a filter element extending across the passageway, a heating unit operable to heat the fuel within the device, and a thermostat operable responsive to the temperature of the fuel to control operation of the heating unit.

Structurally, the filter device 10 includes a body such as casting 12 having the aforementioned inlet 14 and outlet 16, which can be in the form of threaded taps. A sediment bowl 18 is secured against an annular seat on one end of the body 12 by adjustable screw clamp 20 mounted on U-shaped bail 22 supported by the body. O-ring 24 between the body 12 and the bowl 18 seals the two together to define therein a fluid-tight chamber 26.

An annular filter element 28 is positioned snuggly in recess 30 in the casting 12 and held therein by biasing spring 32 and retainer cap 34. Bore 36 in the casting in line with the hollow portion 37 of filter 28 extends into the casting and is communicated by bore 38 extending to the outlet 16. Bores 39 and 40 in the casting communicate the inlet 14 with chamber 26 at the annular section outside of the filter 28.

Thus a continuous flow passageway is completed through the filter device 10 from the inlet 14 via bores 39 and 40 to chamber 26, across the cylindrical wall section presented by filter 28, through bores 36 and 38 to outlet 16.

A heating unit 42 is positioned centrally of the bore 36 and the defined hollow 37 within filter 28, and supported therein by appropriate means. The heater unit 42 is a unitary assembly having at its widest end a threaded nut 43 threaded into opening 44 in body 12 in general alignment with the defined bore 36. The heater unit 42 also includes a hollow narrower ceramic core 46 which is held against the nut 43 by headed bolt 48 extending through the hollow core 46 and nut 43 and secured by nut 50 at its end outside of the filter device 10. A rubber-like sleeve 52 both insulates the bolt 48 electrically from nut 43 and seals the defined chamber 26 from leakage to outside the device 10.

A heating element 56 is wound around the core 46 in the conventional manner and is electrically connected as by friction fit or soldering to the nut 43 and to bolt 48 at the opposite ends of the core 46. The body 12 is provided with an electrical connection 58 which can be to ground as is appropriate. Similarly, terminal 60 of lead 61 can be provided and electrically connected to the bolt 48. Thus an electric circuit can be completed from terminal 60, bolt 48, heating element 56, to the nut 43 and body 12, and to ground through connection 58. The energized heating element being immersed in the fuel quickly heats the fuel as desired.

A thermostat 62 is mounted by bolts 63 on body 12 adjacent the bore 36 operable to detect the temperature of the fuel within the bore. The thermostat 62 can be of a conventional normally closed, snap action-type held flush against the body. The previously recited electric circuit through the heating element 56 can thus be controlled by the thermostat 62 through lead 61 to terminal 66 of the thermostat, through the thermostat, and from terminal 68 of the thermostat by lead 70 to a power source (not shown), as is common in the art.

It is thus seen that the filter device 10 includes the filter element 28, the heating unit 42 and the thermostat 62, all of which may be separately installed or replaced independently of the other. Thus, for example, the heating unit 42 is removed as a one-piece assembly by withdrawing it from the threaded opening 44. Similarly, the filter element 28 can be replaced by removal of the sediment bowl 18. The thermostat 62 is replaced by removal of screws 63 as previously noted.

While the subject filter device shows the heater unit 42 in the bore 36 on the downstream side of filter element 28, it could also be in other appropriate places. Thus, for instance, the bore 40 could be enlarged sufficiently to allow the positioning of heater unit 42 therein, and a threaded opening (not shown) aligned therewith could support the unit. Other modifications could also be made to the structure without departing from the inventive concept of the subject disclosure. Thus it is desired that the invention be limited only by the appended claims and not by the particular embodiment shown.

What we claim is:

1. A fuel filter device, comprising in combination, a body having an inlet, an outlet, an annular exterior seat, and separate passage means from the inlet and outlet terminating openly on the exterior of the body within the annular seat, closure means engaging the seat to define across the separate passage means a continuous fluid-tight passageway from the inlet to the outlet, a filter element supported by the body across said passageway, said body having an exterior opening therein communicating with one of the passage means, an elongated heater unit having one end narrower than said opening and receivable therein to within the passageway, means disposed at the other end of the heater unit operable to support the heater unit, to seal closed said opening and to be securable from the exterior of the unit, a thermostat supported exteriorly on the body, said thermostat having temperature sensitive means adjacent the passageway operable to sense temperature of fuel therein and having control means connected to the heater unit operable to control the heater unit responsive to the temperature sensitive means, and said thermostat being securable completely from the exterior of the body.

2. A fuel filter device, comprising in combination, a body having an inlet, an outlet, an annular exterior seat, and separate passage means from the inlet and outlet terminating openly on the exterior of the body within the annular seat, a sediment bowl having an outer rim matable sealingly with the seat to define across the separate passage means a continuous fluid-tight passageway from the inlet to the outlet, means to maintain said sediment bowl against said seat, a filter element in line with one of the passage means and having one end thereof abutting the body across said passageway, means engaging the opposite end of the filter element operable to maintain said element tight against body, said body having an external opening therein in line with and communicating with one of the passage means, an elongated heater unit having one end thereof narrower than said opening and receivable therein to within the passage means, means disposed at the other end of the heater unit operable to seal said opening and to support the unit, and a thermostat supported exteriorly on the body adjacent the passageway, said thermostat having a temperature sensitive means operable to sense indirectly through the body the temperature of fuel therein and having control means connected to the heater unit operable to control the actuation of the heater unit responsive to the temperature sensitive means, said heater unit, filter unit and thermostat each being supported independently of one another and each being separately connectable to the body.

3. A fuel filter device, comprising in combination, body structure having an inlet and an outlet, a bowl, means including said body structure and said bowl defining a fluid-tight, continuous, internal passageway including at least one bore and acting to interconnect said inlet and said outlet, a filter element supported by said body structure across said passageway, said body structure further having an opening therein, in line generally with said bore and extending between said bore and the outside of said body structure, a heater unit extending through the opening to within the bore and securely supported by the body structure effective to seal said opening, a thermostat supported on the body structure exteriorly thereof, said thermostat having temperature-sensitive means in heat sensing relationship with the passageway operable to sense through the body structure the temperature of the fuel therein and having control means connected to the heater unit operable to control the operation of the heater unit responsive thereto.

References Cited by the Examiner
UNITED STATES PATENTS

| | | | |
|---|---|---|---|
| 1,075,978 | 10/1913 | Joerin et al. | 210—184 X |
| 2,635,174 | 4/1953 | Kasten | 219—184 X |
| 2,902,158 | 9/1959 | Muller | 210—184 |

FOREIGN PATENTS

| | | |
|---|---|---|
| 513,329 | 2/1955 | Italy. |

REUBEN FRIEDMAN, *Primary Examiner.*

HERBERT L. MARTIN, *Examiner.*